United States Patent [19]
Leksen

[11] 3,914,959
[45] Oct. 28, 1975

[54] IMPROVEMENTS IN SLIDING BLOCK IN SLIDING BLOCK COUPLING

[75] Inventor: Lars Folke Leksen, Smedjebacken, Sweden

[73] Assignee: Morgardshammar Aktiebolag, Smedjebacken, Sweden

[22] Filed: May 29, 1973

[21] Appl. No.: 364,650

[52] U.S. Cl. .............................................. 64/7; 64/7
[51] Int. Cl.² .......................................... F16D 3/02
[58] Field of Search .............................. 64/8, 7, 6, 5

[56] References Cited
UNITED STATES PATENTS

| | | | |
|---|---|---|---|
| 1,271,905 | 7/1918 | Jones | 64/6 |
| 1,316,733 | 9/1919 | McGee | 64/6 |
| 2,305,698 | 12/1942 | Irvin | 64/7 |
| 2,305,702 | 12/1942 | Irvin | 64/7 |
| 2,305,703 | 12/1942 | Smith | 64/7 |
| 2,460,361 | 2/1949 | Petho | 64/7 |
| 2,500,277 | 3/1950 | Duffy | 64/7 |
| 3,079,772 | 3/1963 | Reuter | 64/8 |
| 3,443,400 | 5/1969 | Polhäll et al. | 64/8 |

*Primary Examiner*—Samuel Scott
*Assistant Examiner*—Randall Heald

[57] ABSTRACT

A sliding block coupling includes a cylindrical coupling head interconnected between input and output shaft members. The coupling head has a cylindrical recess, the geometric axis of which extends perpendicular to the axis of the coupling head. One of the driving or driven members has an end of flat shape with two parallel side surfaces located within the cylindrical recess. A sliding block means is provided on the two parallel side surfaces to partially fill the space between the side surfaces and the cylindrical recess. The sliding block means comprises two block members which are separated from each other and have a cylindrical surface which slides on the surface defining said recess and a plane surface which slides on the parallel side surfaces of the one member. The moment of rotation is transferred between the input and output members via the block members. A rod interconnects the block members and maintains them in a spaced apart relationship and has a smaller cross-sectional area than that of the block members. The block members have a rounded preferably spherical sliding surface abutting a casing which encloses the coupling head the flat end of the one member and the sliding block. The construction provides a substantially large space for lubricating grease and in addition one block may be replaced upon wear thereof.

3 Claims, 4 Drawing Figures

U.S. Patent Oct. 28, 1975 3,914,959
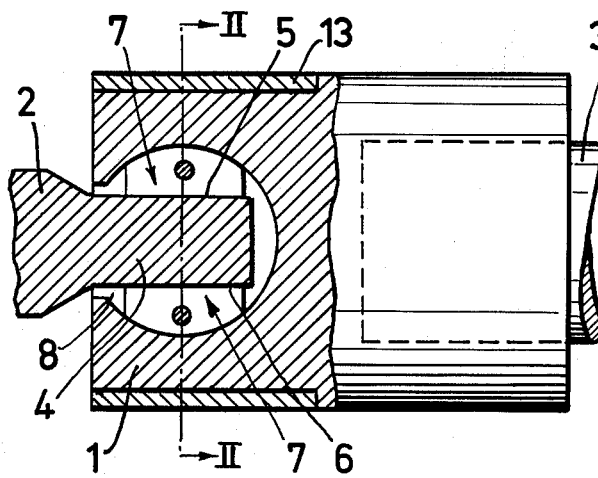
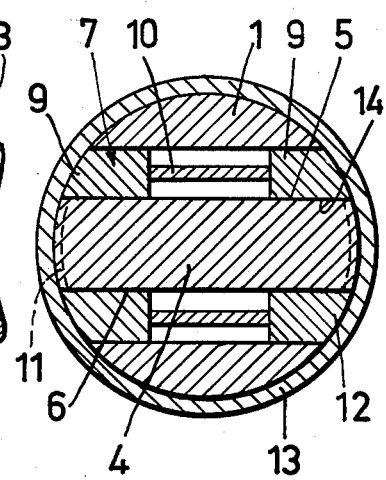
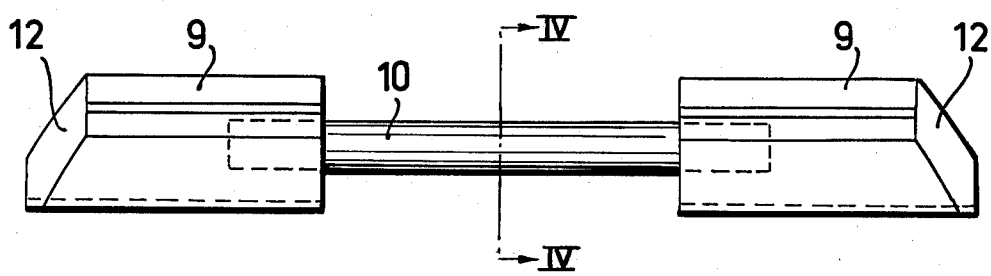
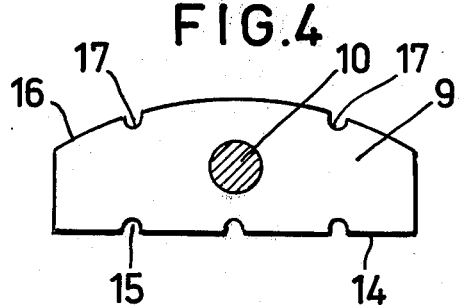

IMPROVEMENTS IN SLIDING BLOCK IN SLIDING BLOCK COUPLING

BACKGROUND OF THE INVENTION

The present invention relates to a coupling for providing a driving connection between input and output members. The coupling to which the present invention relates is of a sliding block construction.

Sliding block couplings are known which include a coupling mechanism for transmitting driving torque between the input and output shaft members, whose one of the shaft members has a flat surface which is located in a cylindrical recess in the coupling head and sliding blocks transmit torque between a flat end of the one shaft and the coupling head. Primarily such couplings have been used for transmitting torque from a driving rolling mill spindle to a roll neck, or, alternatively, from a pinion neck to a rolling mill spindle.

The sliding block couplings of the prior art have not been entirely satisfactory since a minimum space for lubricating grease was provided and in addition the entire sliding block construction had to be exchanged in its entirety when one portion of the construction was worn. This was a particular problem in non-reversible rolling since only one half of the block is actually worn in non-reversible rolling but in the prior art the entire block had to be replaced.

SUMMARY OF THE PRESENT INVENTION

The present invention is directed to a sliding block coupling in which a substantilly larger space for lubricating grease is provided than in known prior art and in addition a construction where only a portion of the sliding block construction may be replaced for purposes of repair. The present invention includes a sliding block coupling wherein a pair of block members are separated from each other by a rod or the like which may have a cross-sectional area substantially smaller than the block members. The rod is rigidly clamped for example by threaded engagement into the block members or lockingly engaged therein. As a result of this construction when one block is worn, it only need be replaced, and in addition a substantial space for lubricating grease is provided.

Moreover, the design of the present invention provides the advantages of a considerably smaller material consumption and a considerably simpler manufacture than heretofore. Moreover, in view of the fact that for non-reversible rolling only one block member is worn and need be replaced, a lower operation cost results.

DESCRIPTION OF THE FIGURES

Further features and advantages of the present invention will be apparent to those skilled in the art to which it relates from the following detailed description thereof made with reference to the accompanying drawings in which:

FIG. 1 is a lateral view partially in section of a sliding block coupling embodying the present invention;

FIG. 2 is a sectional view of the coupling of FIG. 1 taken along the lines II—II in FIG. 1;

FIG. 3 is a perspective view of a portion of the sliding block coupling of FIG. 1; and FIG. 4 is a sectional view taken along the lines IV—IV of FIG. 3.

DESCRIPTION OF THE PREFERRED EMBODIMENT

FIG. 1 illustrates a sliding block coupling which embodies the present invention. The sliding block coupling includes a coupling head 1 interconnected between an input shaft 2 and an output shaft 3. While the shafts 2 and 3 are respectively labeled input and output shafts, it should be understood that the coupling provides for the transmission of torque between the shafts and either of the shafts may be the input or output member.

The end of the shaft 2 which is illustrated in FIG. 1 is provided with a flat construction designated 4 and, specifically, it is provided with two parallel plane side surfaces 5 and 6. As illustrated, a sliding block construction 7 is disposed on the plane side surface 5 and another sliding block construction 7 is provided beneath the side surface 6. The flat end 4 of the shaft 2 as well as the sliding block constructions 7 are located in a cylindrical recess 8 in the coupling head 1. The cylindrical recess 8 is formed so that its geometric axis extends perppendicular to the axis of the coupling head. A casing 13 encloses these elements.

Each of the sliding block constructions which are disposed on the respective opposite sides of the end 4 of the shaft 2 include a pair of block members 9 which are spaced apart by means of a suitable spacer 10. The spacer 10 in the preferred embodiment comprises a rod which is threadably engaged in the block members 9. The rod, of course, may be otherwise connected to the blocks 9 and may be clamped therein by any suitable construction.

Of course the construction of the coupling head is such to permit the shaft 2 to be pivoted in the coupling head 1. Therefore, the side surfaces 11 of the end 4 of the shaft 2 and the slide surfaces 12 of the block members 9 are rounded and preferably spherical so as to enable the necessary vertical and lateral movements of the shaft 2 to occur within the coupling head 1. The surfaces 11, 12 slide or move relative to the casing 13. In view of the fact that the end surfaces 11 and 12 of the block members are rounded and preferably spherical, these surfaces have a line or linear contact with the casing 13. This of course provides a space between the surfaces 11 and 12 and the casing 13. The space may be filled in a manner known by a sealing cover, not shown, which may be interposed between the surfaces 11 and 12 and the casing 13. Such sealing cover would have on one side a cylindrical shape and on the other side a spherical cap-like shape and could function to center the parts in the recess.

The block members 9 also have a plane surface 14 which abut and are supported for sliding movement on the parallel side surfaces 5 and 6 of the end 4 of the shaft 2. The surface 14 is provided with lubrication grooves 15 and the block members 9 also have a surface 16 of cylindrical shape to abut and slide against the surface defining cylindrical recess 8. The surface 16 of the block members 9 is also provided with lubrication grooves 17.

From the above it should be apparent that the shaft 2 may pivot relative to the casing 13 in a universal manner and specifically may pivot in a direction about a horizontal axis at which time the block members 9 would have relative sliding movement with respect to the surface defining the recess 8 and as well with respect to the surfaces 5 and 6 of the shaft 2. In addition, the shaft may pivot about a generally vertical axis and in that case the end surfaces 12 and 11 of the block members and shaft respectively would have relative sliding contact with the casing 13. In addition some sliding contact may occur between the surfaces 14 of the block members 9 and the surfaces 5 and 6 of the shaft 2.

In view of the above it should be apparent that a space is provided surrounding the block members 9 and in the area defined by the rod 10 which has a small cross sectional dimension than that of the block members 9. This space provides a substantial space for lubricating grease. In addition it should be apparent that in the event one of the block members 9 is worn, which would be the case when non-reversible rolling is effected, than only that block member which is worn need be replaced. This replacement may be readily accomplished due to the threaded connection of the block member 9 and the rod member 10. Accordingly, applicant has provided a substantially improved construction which not only permits the replacement of a single block member 9 but also provides for an increase in the space for lubricating grease in the assembly.

What I claim is:

1. In a sliding block coupling, a coupling head with a driving member at one end and a driven member at the other end, the coupling head having a cylindrical recess therein, the geometric axis of said recess extending perpendicular to the axis of the coupling head, one of said members having an end of flat shape with two parallel side surfaces located within said cylindrical recess, and sliding block means provided on said two parallel side surfaces to partially fill the space between the flat end of said one member and the cylindrical recess, a casing enclosing the coupling head, said flat end and said sliding block means, each of said sliding block means comprising two block members separated from each other and having a cylindrical surface which slides on the surface defining said recess and a plane surface which slides on the respective parallel side surface of said one member, said block members having a rounded sliding surface abutting said casing, the moment of rotation being transferred between said input member and output member via said block members, and a rigid interconnection between said block members, said rigid interconnection comprising a single rigid rod-like member fixedly and releasably engaged, the areas between each side surface and the cylindrical recess and between each pair of block members therebetween defining substantially large volumes for lubricating grease.

2. A sliding block as defined in claim 1, wherein said cylindrical and plane sliding surfaces of said block members are provided with lubricating grooves.

3. A sliding block as defined in claim 1 wherein said coupling head is cylindrical, and said recess extends diametrically therethrough, and said casing encircles said coupling head and closes the opposite ends of said recess.

* * * * *

UNITED STATES PATENT OFFICE
CERTIFICATE OF CORRECTION

Patent No. 3,914,959   Dated October 28, 1975

Inventor(s) Lars Fooke Leksen

It is certified that error appears in the above-identified patent and that said Letters Patent are hereby corrected as shown below:

In claim 1, after line 23 add --to each of said block members and maintaining them spaced apart and having a cross-sectional area substantially smaller than said block members,--.

Signed and Sealed this twenty-fourth Day of February 1976

[SEAL]

Attest:

RUTH C. MASON
Attesting Officer

C. MARSHALL DANN
Commissioner of Patents and Trademarks